US006939944B2

(12) United States Patent
Kutsek

(10) Patent No.: US 6,939,944 B2
(45) Date of Patent: Sep. 6, 2005

(54) INHIBITION OF ROSIN CRYSTALLIZATION

(75) Inventor: George Joseph Kutsek, South Park, PA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/331,516

(22) Filed: Dec. 30, 2002

(65) Prior Publication Data

US 2004/0127681 A1 Jul. 1, 2004

(51) Int. Cl.[7] .............................. C09F 1/00; C09F 1/02; C09F 1/04; C08L 89/00
(52) U.S. Cl. .................... 530/210; 530/215; 524/798
(58) Field of Search ................... 530/210, 215; 524/798

(56) References Cited

U.S. PATENT DOCUMENTS

| | | | | | |
|---|---|---|---|---|---|
| 1,787,281 A | * | 12/1930 | Palmer | ................. | 530/225 |
| 1,931,226 A | * | 10/1933 | Humphrey | ................. | 530/210 |
| 2,042,877 A | * | 6/1936 | Borglin | ................. | 530/210 |
| 2,309,346 A | * | 1/1943 | Landes | ................. | 106/238 |
| 2,776,275 A | * | 1/1957 | Strardins | ................. | 106/238 |
| 2,776,905 A | * | 1/1957 | Keim | ................. | 106/238 |
| 2,881,084 A | | 4/1959 | Watkins | | |
| 2,887,475 A | | 5/1959 | Watkins | | |
| 2,933,486 A | * | 4/1960 | Strazdins | ................. | 530/210 |
| 2,985,537 A | * | 5/1961 | Watkins | ................. | 106/238 |
| 3,684,735 A | | 8/1972 | Oppenlaender et al. | | |
| 4,105,462 A | * | 8/1978 | Thanos | ................. | 106/218 |
| 4,437,894 A | * | 3/1984 | Emerson | ................. | 106/238 |
| 4,536,333 A | * | 8/1985 | Olechowski | ................. | 530/211 |
| 4,681,909 A | * | 7/1987 | Ohta et al. | ................. | 524/272 |
| 5,256,709 A | | 10/1993 | Ross et al. | | |
| 5,998,576 A | * | 12/1999 | Sadamitsu et al. | ................. | 530/210 |
| 6,387,317 B1 | | 5/2002 | Roberts | | |
| 6,407,197 B1 | | 6/2002 | Van Den Berg et al. | | |

FOREIGN PATENT DOCUMENTS

| | | |
|---|---|---|
| DE | 31 02 085 A | 9/1982 |
| DE | 32 05 734 A1 | 8/1983 |
| DE | 44 09 239 A1 | 9/1995 |
| EP | 0 535 509 A | 4/1993 |
| WO | WO 82/02396 A | 7/1982 |
| WO | WO 96/21698 A | 7/1996 |

* cited by examiner

Primary Examiner—Nathan M. Nutter
(74) Attorney, Agent, or Firm—Polly C. Owen; Bernard J. Graves, Jr.

(57) ABSTRACT

The invention relates to the inhibition of crystallization in rosin and rosin-based materials through the use of crystallization inhibitors. More specifically, the crystallization inhibitor is selected from the group consisting of carboxylic acids and the salts of carboxylic acids. The invention also relates to the process of inhibiting crystallization in rosin and rosin-based materials.

36 Claims, No Drawings

INHIBITION OF ROSIN CRYSTALLIZATION

FIELD OF THE INVENTION

The present invention relates to the inhibition of rosin crystallization in a rosin-based material, the use of crystallization inhibited rosins in various items such as adhesives, both hot-melt and aqueous dispersions, and in sizing agents for cellulosics, such as paper.

BACKGROUND OF THE INVENTION

Rosin is a commercially valuable, naturally occurring material used in various products, such as, for example, adhesives, sealants, printing inks and sizing agents for paper. Pine trees yield rosin, and rosin is designated as either wood rosin, gum rosin, or tall oil rosin. The different designations are attributed to the source of the rosin. Wood rosin is obtained through the extraction of rosin from pine stump wood. Gum rosin is obtained through the tapping of living pine trees.

Tall oil rosin is a byproduct of the process for making wood pulp for paper. In this process, wood is digested with sodium sulfite and caustic soda. The sodium salts obtained produce, on acidification, a dark, almost black, oily liquid with a strong, unpleasant odor. This is crude tall oil. The composition of the tall oil varies with the method employed, but usually includes about 10% unsaponifiable matter, with a remainder of approximately equal proportions of fatty acids and rosin acids. The fatty acids in the tall oil rosin comprise oleic and linoleic acid.

The principal components of rosin are rosin acids. Rosin acids comprise abietic acid forms and their isomers. Abietic acid is the most prevalent rosin acid contained in rosin.

Rosin-based material compositions containing free rosin acid often form crystals. Rosin acids are readily crystallized, and the resultant crystals are insoluble in water and alkali and are associated with many problems such as plugging pipelines, filters, and strainers of process equipment. Although these crystals grow relatively slowly, if their growth is unimpeded, the crystals can increase viscosity, decrease stability, and often render the rosin-based material composition unsuitable for use.

Crystallization of rosin acids depends on the type of rosin-based material used. When the rosin acid content of the rosin-based material is fairly high, there is an increased tendency for the rosin acids in the rosin to crystallize. Inhibiting crystal formation extends the product shelf life and avoids the aforementioned handling difficulties. The tendency of rosin types to crystallize is, in increasing order: wood, gum, and tall oil rosin. Wood rosin typically has a rosin acid content of about 87%. Gum rosin typically has a rosin acid content of about 92% and has a greater propensity to form crystals than wood rosin. Tall oil rosin typically contains up to 90% rosin acids and is also more likely to crystallize than is wood rosin.

In the past, methods have been used to inhibit the formation of crystals in rosin-based material. These methods have included, disproportionation treatment, which involves contacting rosin-based material with an active disproportion catalyst at an elevated temperature for a period of time until the amount of rosin acids has been reduced. Catalysts traditionally used in the disproportion of rosin-based material include palladium, platinum, nickel, iodine, sulfur and the like. While effective in reducing the tendency of rosin-based material compositions to crystallize, disproportion treatment is costly due in part to the expense associated with the disproportion catalysts.

Another method used to inhibit the formation of crystals in rosin-based material involves contacting rosin-based material with formaldehyde in order to modify the rosin structure by disrupting its close packing, which is required for crystal formation. However, formaldehyde has been identified as a toxic substance, and its continued use is discouraged.

A need exists for a simple, safe, and cost-effective way to inhibit the formation of crystals of rosin acids in rosin-based material compositions without the use of costly disproportion processes or through the use of hazardous substances such as formaldehyde.

BRIEF DESCRIPTIONS OF THE INVENTION

It is an object of this invention to provide a crystallization inhibited rosin composition comprising at least one rosin-based material and at least one crystallization inhibitor.

It is another object of this invention to provide a crystallization inhibited rosin composition comprising a rosin-based material and a crystallization inhibitor; wherein the crystallization inhibitor is selected from the group consisting of carboxylic acids and salts of carboxylic acids.

It is another object of this invention to provide a crystallization inhibited rosin composition comprising a rosin-based material and sodium acetate as a crystallization inhibitor.

It is yet another object of this invention to provide a process for producing a crystallization inhibited rosin composition comprising contacting a rosin-based material and a crystallization inhibitor.

In accordance with one embodiment of this invention, a crystallization inhibited rosin composition comprising a rosin-based material and a crystallization inhibitor is provided.

In accordance with another embodiment of this invention, a crystallization inhibited rosin composition comprising a rosin-based material and a crystallization inhibitor is provided, wherein the crystallization inhibitor is selected from the group consisting of carboxylic acids and salts of carboxylic acids.

In accordance with another embodiment of this invention, a crystallization inhibited rosin composition comprising a rosin-based material and sodium acetate is provided.

In accordance with yet another embodiment of this invention, a process is provided to produce a crystallization inhibited rosin composition comprising contacting a crystallization inhibitor and a rosin-based material.

These objects, and other objects, will become more apparent to those with ordinary skill in the art after reading this disclosure.

DETAILED DESCRIPTION OF THE INVENTION

In the present invention, a crystallization inhibited rosin composition comprising a rosin-based material and a crystallization inhibitor is provided. The rosin-based material is any material, which contains free rosin acid. Typically, the rosin-based material can be rosin obtained from wood rosin, gum rosin or tall oil rosin. The rosin-based material can be hydrogenated which can reduce its tendency to oxidize and can improve color stability. Rosin acids are generally defined as diterpene carboxylic acids based on an alkyl-substituted perhydrophenanthrene ring structure. Free rosin acid is defined as rosin that is not chemically bonded to any other element Typically, rosin acids comprise abietic acid forms and their isomers. Abietic acid is the most prevalent rosin acid. Other rosin acids also can be present in the rosin-based material, but these are typically isomers of abietic acid. Abietic acid, also known as abietinic acid or sylvic acid, has the formula $C_{19}H_{29}COOH$ and contains a phenanthrene ring system. Abietic acid forms and their isomers include, but are not limited to, levopimaric acid, palustric acid, neoabietic acid, aleoabietic acid, dihydroabietic acid, dehydroabietic acid, tetrahydroabietic acid, dextropimaric acid, isodextropimaric acid, pimaric acid isopimaric acid, sandaracopimaric acid, delta 8-isopimaric acid, 7,15 pimaradienoic acid, and delta 8-pimaric acid, and mixtures thereof.

Rosin acids readily crystallize causing problems with the use of the rosin-based material. Crystallization of the rosin-based material can increase viscosity resulting in plugging of process equipment and reduced storage life.

The crystallization inhibitor of the present invention comprises carboxylic acids and their salts. The crystallization inhibitor can be any carboxylic acid or its salt, other than a rosin acid, which inhibits the formation of crystals in the rosin-based material. The crystallization inhibitor, in either its acid or salt form, is added to the rosin-based material either while the rosin-based material is in a molten state or when the rosin-based material is dispersed in a rosin-based material dispersion.

The carboxylic acids of the present invention can be either aliphatic or aromatic acids. If the carboxylic acid is aliphatic, it can be defined by the following formula: $R^1COOH$ where $R^1$ can be either H or $CH_3(CH_2)_n$ and where n is a number from 0 to 5. The preferred aliphatic carboxylic acid is selected from the group consisting of formic, acetic, propanoic, butyric acids, and mixtures thereof. The most preferred aliphatic carboxylic acid is acetic acid.

The carboxylic acid of the present invention may also be an aromatic carboxylic acid defined by the formula: $R^2COOH$ where $R^2$ comprises an aromatic group. The aromatic group can be substituted or unsubstituted. $R^2$ can contain an aliphatic and aromatic group. An example of an aromatic carboxylic acid is benzoic acid.

Salts of the carboxylic acids of use in the present invention comprise an alkali metal salt of carboxylic acid. The alkali metal salt can be selected from the group consisting of sodium, potassium and ammonium. Of the alkali metal salts, sodium and potassium are preferred, and sodium salt is most preferred. Sodium acetate is the preferred embodiment for the crystallization inhibitor of the present invention.

The crystallization inhibitor is added to the rosin-based material in an effective amount to decrease or delay the formation of crystals of the free rosin acids when compared to the rosin-based material without the crystallization inhibitor. In molten rosin-based material, typically, from about 0.3 to about 5% by weight of the crystallization inhibitor is added, preferably, about 0.5 to about 3%, and most preferably, from 1 to 2% by weight. In water-based dispersions, an effective amount of the crystallization inhibitor ranges from about 5% or less by weight based on the weight of the water-based dispersion, preferably, about 1% or less by weight of the water-based dispersion, and more preferably, 0.5% or less by weight of the water-based dispersion, most preferably, 0.3% by weight of the water-based dispersion.

When used with molten rosin-based material to inhibit the formation of rosin acid crystals, the crystallization inhibitor is added to the rosin-based material while it is in the molten state. The crystallization inhibitor is simply mixed into the molten rosin-based material using standard mixing techniques known to those of ordinary skill in the art. The presence of the crystallization inhibitor in the molten rosin-based material reduces the formation of crystals in the rosin-based material as it cools to a solid form. By reducing the formation of crystals in the rosin-based material as it cools, if the solid rosin-based material is subsequently heated up to its melting point, it will do so without the formation of additional crystals. Without the use of the crystallization inhibitor of the present invention, the re-melting of the solid rosin-based material can be a difficult task due to the increased viscosity of the rosin-based material.

Molten rosin-based material can reach a crystallization rate maximum at about 120° C. At temperatures above about 150° C., molten rosin-based material has been found not to crystallize, and at temperatures above about 170° C., any nuclei, which are necessary for the formation of crystals when the material is subsequently cooled, can be destroyed. Addition of a crystallization inhibitor to molten rosin-based material permits one to hold the molten rosin-based material at a lower temperature while inhibiting the formation of crystals, which provides a cost savings to the process.

When using the crystallization inhibitors in molten rosin-based material, selection of the crystallization inhibitor can be dependent upon the volatility of the crystallization inhibitor at the temperature of the molten rosin-based material. While the acid form of the carboxylic acid are effective in reducing the formation of crystals in molten rosin-based material as it is cooled, the preferred crystallization inhibitors for use in decreasing crystallization formation in molten rosin-based material are the salts of carboxylic acids. The preferred crystallization inhibitor for use in molten rosin are the alkali metal salts of acetic acid, with the most preferred being the sodium salt of acetic acid.

The crystallization inhibitors of the present invention can also be used to inhibit crystal formation in rosin-based material dispersions. Preferably, the crystallization inhibitor is added when the rosin-based material dispersion is already produced. Selection of a crystallization inhibitor for use in a particular rosin-based material dispersion can be determined based on the stability of the dispersion itself. A particular crystallization inhibitor can cause a particular rosin-based material dispersion to coagulate. Various crystallization inhibitors may have to be screened for a particular rosin-based material dispersion to determine its compatibility. This is accomplished by adding aqueous solutions of the crystallization inhibitors to the rosin-based material dispersions and evaluating the samples at regular intervals for the appearance of coarse particles and/or the appearance of crystals. The samples are compared to a control sample which received no treatment. A crystallization inhibitor is deemed effective if it decreases or delays the onset of crystal formation in the rosin-based material dispersions.

Generally, rosin-based material dispersions comprise at least one rosin-based material and at least one emulsifier. Generally, the rosin-based material dispersion has a solids content ranging from about 25% to about 60% by weight, preferably, from 40% to 55% by weight. The viscosity of the rosin-based material dispersion ranges from about 200 to about 9,000 centipoise, preferably from 500 to 4,000 centipoise. The mean particle diameter of the solids in the rosin-based material dispersion is generally less than 3 microns, preferably ranging from 0.25 to 1.0 microns. The pH of the rosin-based material dispersion ranges from about 7 to about 11, preferably from about 8 to about 10.5.

Typically, the emulsifier can be any material capable of sufficiently dispersing the rosin-based material into droplets and adequately inhibiting coalescence. Preferably, the emulsifier is a surfactant. Among the surfactants of utility in the rosin-based material dispersions of the invention include alkali metal soaps of carboxylates, such as, but not limited to, wood rosins, gum rosins, tall oil rosins, disproportionated rosins, polymerized rosins, hydrogenated rosins, esters thereof, and/or blends thereof. Surfactants can also be alkali metal salts, ammonium salts, amine salts of sulphates, and sulphonates, sulfates and sulfonates of fatty acids, and mixtures thereof. Amine salts of sulphates and sulphonates include, but are not limited to alkyl sulfates, alkyl sulphonates, alkyl aryl sulphates, alkyl aryl sulphonates, ethoxylated alkylphenol sulfates and ethoxylated alkylphenol sulfonates. Potassium soaps of wood rosin are the preferred surfactants.

Rosin acids, in rosin-based material dispersions, may be reacted with potassium hydroxide to form potassium rosinate, an excellent emulsifier for rosin-based material dispersions containing hydrocarbon resins.

Rosin-based material dispersions of this invention may be produced through a process using either a direct emulsification method or an invert emulsification method. The process may be batch, semi-continuous or continuous in nature. They may range from solvent-assisted systems to solvent-less systems. In a solvent-assisted system, rosin-based material is cut in a hydrocarbon solvent at a minimum level required to assist the emulsification and is subsequently added to water. The term "water-based dispersion" is used to describe solvent-less systems that do not use solvents.

Generally, the direct emulsification method is characterized by the fact that an emulsifier is contacted with a rosin-based material to produce an organic phase mixture, and the organic phase mixture is subjected to shear to produce the rosin-based material dispersion. Equipment which induces shear forces in the organic phase mixture include, but are not limited to, a homogenizer, a pebble-mill, Cowels mixer, and a high-speed impeller. This equipment, in addition to being able to induce shear force, can also be capable of generating high pressures and high temperatures. The direct emulsification method, although effective, does not produce the most stable rosin-based material dispersions. Rosin-based material dispersions produced by the direct emulsification method often exhibit larger and more widely distributed particle sizes, which contribute to rosin-based material dispersion instability.

The invert emulsification method is fundamentally different from the direct emulsification method. The emulsifier is first dissolved or dispersed in the rosin-based material, then water is added to form a water in oil (w/o) emulsion. In the inversion process, the water in oil (w/o) emulsion of rosin-based material and emulsifier is slowly diluted with water until it becomes an oil in water (o/w) emulsion. As the water is added, fine droplets of water get dispersed in the rosin-based material, then the system inverts forming the rosin-based material dispersion. The rosin-based material dispersion is a continuous phase of water with dispersed rosin-based material droplets. The inversion process is the preferred method of manufacture of the rosin-based material dispersion.

Rosin-based materials suitable for the rosin-based material dispersions include, but are not limited to, rosins and resins derived from wood, gum, and tall oil sources and blends thereof. Rosin-based materials may also be used in conjunction with hydrocarbon resins. Suitable hydrocarbon resins are low molecular weight thermoplastic polymers derived from cracked petroleum distillates, terpene fractions, coal tar and a variety of pure monomers. The hydrocarbon resins can be aliphatic, aromatic, aliphatic-aromatic, or any combination thereof. Additionally, the hydrocarbon resin can be produced through chemical reaction such as polymerization of pure or mixed character monomers or through physical blending of precursor resins. The hydrocarbon resins can be hydrogenated to any desired degree.

The hydrocarbon resins used can range in Ring and Ball (R&B) softening point, as determined by ASTME-28, from about 10° C. to about 190° C. and have weight average molecular weights (Mw), as determined by ASTM D 6579 from about 300 to about 10,000 Mw. Preferably, the hydrocarbon resins range in R&B softening point from about 60° C. to about 120° C. and have weight average molecular weights from about 300 to about 2,000 Mw. Most preferably, the hydrocarbon resins range in R&B softening point from 65° C. to 85° C. Preferably, the resins have a weight average molecular weight in the range of about 300 to about 5,000 Mw.

Various additives can be included in the crystallization inhibited rosin composition. Additives for both molten rosin-based material and rosin-based material dispersions comprise plasticizers and antioxidants.

Plasticizer(s) can be incorporated into the molten rosin-based material or rosin-based material dispersion to aid in dispersion of the rosin-based material. Plasticizers are frequently added to rosin-based material dispersions to lower the effective softening point of the rosin-based material below maximum operating temperatures of equipment used in either the direct emulsification or indirect emulsification methods. Plasticizers are also added to rosin-based material dispersions to improve wetability characteristics of adhesives containing the rosin-based material dispersions. To be of utility, a plasticizer must be compatible with the rosin-based material and the polymer contained in an adhesive. If the plasticizer is incompatible with the rosin-based material, the plasticizer will phase-separate and prevent formation of the rosin-based material dispersion. If the plasticizer is incompatible with the polymer when the adhesive dries, the plasticizer will migrate to the surface of the dried adhesive thereby reducing performance of the adhesive.

Amongst the plasticizers of utility include, but are not limited to, liquid or low softening point tackifying resins, petroleum-derived oils, aromatic hydrocarbon oils, paraffinic oils, napthenic oils, olefin oligomers, low molecular weight polymers, vegetable and animal oils and their derivatives, and mixtures thereof. However, it is preferred not to use plasticizers in the rosin-based material dispersions of the invention to avoid the potential problems discussed previously when the rosin-based material dispersions containing plasticiers are utilized as adhesives.

Antioxidant(s) may be incorporated into the molten rosin-based material or rosin-based material dispersion. Generally, antioxidant(s) is used to protect the rosin from oxidation. Hindered bis-phenols are typically used for rosin-based material dispersions used in applications where minimum staining and discoloration are desired. If discoloration and/or staining is unimportant, an amine-type antioxidant can be used. Antioxidants are typically added to the rosin-based material, the rosin-based material dispersion, and the adhesive formulation containing the rosin-based material dispersion. Antioxidant loading levels are selected based upon Food and Drug Association (FDA) specified maximum loading levels desired protection level and loading cost effectiveness. Among the antioxidants of utility in the rosin-based material dispersions of the invention, it has been found that up to 0.5 wt % of BHT (2,6 di-tert-butyl para-cresol) or Tetrakis[methylene(3,5 di-tert-butyl-4-hydroxyhydrocinnamate)]methane is added to the rosin-based material dispersions of the invention to prevent oxidation and color degradation of adhesive formulations containing rosin-based material dispersions of the invention. Addition of BHT at 0.25 wt % to rosin-based material dispersions of the invention is preferred.

Additional additives for rosin-based material dispersions include, but are not limited to, gases, surfactants, stabilizers, thickeners, biocides, and preservatives.

Water-soluble resins and gums can be used as stabilizers and thickeners in water-based rosin dispersions. Suitable materials used as stabilizers and thickeners include, but are not limited to, alkaline polyacrylate solutions, alkali soluble acrylic copolymer emulsions, cellulose derivatives, polyvinyl methyl ether, polyurethane thickeners, polyethylene oxide, natural gums, polyvinyl alcohol, and mixtures thereof. Natural gums include, but are not limited to, guar gum, gum arabic, gum karaya, alginates, and casein. It is preferred not to use stabilizers and thickeners since they can potentially interfere with end-performance and add cost to the water-based dispersion. Biocides and preservatives are typically added to rosin-based material dispersions to prevent spoilage. Uncontrolled growth of bacteria in rosin-based material dispersion can affect odor, viscosity, pH and other properties of the products produced. Heavy growth of bacteria in rosin-based material dispersions can result in gassing, coagulation, or clumping. Biocides and preservatives are typically added to rosin-based material dispersions in its final production phases.

As with any of the other additives used in rosin-based material dispersions, biocides and preservatives must be compatible with the rosin-based material dispersion. Incompatible biocides or preservatives can effect both the rosin-based material dispersion and adhesive formulation properties and performance. A water-based dispersion of BIT (1,2-benzisothiazolin-3-one) is a preferred biocide.

One advantage of the present invention is that a crystallization inhibitor can also exhibit preservative qualities that can function as a preservative and can replace some of the preservatives previously listed. One such crystallization inhibitor is propionic acid and its salts. It is known that propionic acid has preservative qualities and prevents spoilage in many commercial medicinal and personal care products. Its use can therefore be extended to rosin-based material dispersions to inhibit bacterial growth. Sodium propionate is the preferred crystallization inhibitor that exhibit preservative qualities.

Crystallization inhibited rosin compositions can be utilized in various industrial purposes, such as, but not limited to, adhesives and sizing compositions. The crystallization inhibited rosin compositions are particularly useful in water-based contact adhesives. Water-based contact adhesives comprise a crystallization inhibited rosin composition and a polymer. The adhesive can be a contact adhesive or a pressure sensitive adhesive. The polymer can be in a form of a latex. Among the polymers useful in water-based contact adhesives, include, but are not limited to, polychloroprene, natural rubber, styrene-butadiene rubber, acrylics, and mixtures thereof. Crystallization inhibited rosin compositions of this invention are particularly useful with polychloroprene latex, specifically anionic polychloroprene latex. Generally, water-based contact adhesives based on polychloroprene comprise polychloroprene latex, a crystallization inhibited rosin composition, a metal oxide, and an antioxidant. Additional components, such as, but not limited to, curatives, antifoams, stabilizers, pH modifiers, and viscosity modifiers can be included as required to meet performance objectives of the water-based contact adhesives.

Crystallization inhibited rosin compositions can also be utilized in paper sizing compositions. Paper sizing is the process of adding materials to paper in order to render the sheet more resistant to penetration by liquids, particularly water. Typical sizing agents include, but are not limited to, rosin, various hydrocarbon and natural waxes, starches, glues, casein, asphalt emulsions, synthetic resins, and cellulose derivatives, The paper size industry utilizes a variety of rosin acid dispersions, and therefore, the present invention is particular useful in paper size compositions because gum and tall oil rosins have been avoided when making paper size compositions due to the crystallization of rosin acids. These gum and tall oil rosins now can be utilized and are less costly than other sources of rosin-based material. The inventive paper size composition comprises at least one crystallization inhibited rosin composition.

EXAMPLES

Water-based adhesives are tested and evaluated by a variety of methods. The test methods utilized in this application are as follows:

Solids (Non-Volatile Content):

The method utilized a microwave drying system equipped with an integral digital computer and electronic balance. The tare weight, sample weight, and weight loss were determined by a North Atlantic Solids Analyzer obtained from North Atlantic Equipment Sales P.O. Box 619, Route 376, Wappinger Falls, N.Y., 12590, USA. Drying time was 5 minutes at full oven power.

An alternate method determined the weight loss on triplicate 0.5 gram samples placed in a 120° C. vacuum oven for 30 minutes. The retained solids were accurately weighed, and the results were within 0.3% of each other to be considered valid.

pH:

A Beckman Atex-60 pH meter with Beckman S105A electrode was used to measure the pH of the sample. Successive measurements agreed within 0.2 pH units to be considered valid.

Viscosity:

Viscosity was measured with a Brookfield Model RVF viscometer obtained from Brookfield Engineering Laboratories, Staughton, Mass., with appropriate spindle for the range of sample at 20 revolutions per minute (rpm) and 25° C.+/−2° C. product temperature. 325 milliliters of sample were placed into a 400 mL beaker. The sample temperature was adjusted to 25° C.+/−2° C. in a constant temperature water bath. The speed was set at 20 rpm. The spindle was lowered into the sample to the mark on the spindle, and the viscometer was started. The spindle was allowed to make 10 revolutions before taking a reading. If the reading was above 90 or below 10, the next lower or higher spindle was utilized, and the test was repeated. The viscosity was calculated in centipoise by multiplying the reading by the appropriate factor for the model, spindle, and speed used.

Particle Diameter:

Mean Particle Diameter was calculated using a Horiba LA900 particle size analyzer obtained from Horiba Instruments Incorporated, 17671 Armstrong Avenue, Irvine Calif. 92614,U.S.A.

Coarse Particles

Coarse particle content is the weight of an aqueous dispersion sample retained on a 45 micron (325 mesh) sieve. 100 grams+/−0.1 grams of an aqueous dispersion was placed into a 300 mL beaker. 120 grams of deionized water was added to the aqueous dispersion, and the mixture was stirred well. The mixture was poured onto the 45 micron sieve. The beaker was rinsed with deionized water, and the rinsate was poured through the sieve. The sieve was then rinsed with deionized water. Excessive force was not used in rinsing the sieve as to force particles though the sieve. The sieve was dried for one hour in an air-circulating oven at 60° C. The percentage of course particles on the 45 micron sieve was calculated according to the following equation:

$$\frac{\text{(sieve-final wt)} - \text{(sieve-tare wt)}}{100 \text{ grams}} \times 100\% = \% \text{ Coarse Particles}$$

Example 1

Use of the Crystallization Inhibitors in TACOLYN® 1065 Resin Dispersion

The following method was used to determine the effectiveness of sodium acetate in inhibiting crystal growth thereby extending the useable shelf life of TACOLYN® 1065 rosin-based material dispersion.

TACOLYN® 1065 rosin-based material dispersion is known to have a limited shelf life due to the development of rosin acid crystals. TACOLYN® 1065 resin dispersion (commercially available from Eastman Chemical) is an aqueous, 55% solids, solvent-free, synthetic rosin-based material dispersion based on a blend of a thermoplastic hydrocarbon resin and rosin-based material containing free rosin acid. It is used as a tackifier in pressure sensitive adhesive formulations.

Apparatus

Quart Jar, 32 ounce wide mouth—89/400, J. M. Gillen, JAR3289

White metal cap w/pulp & aluminum lining, J. M. Gillen, WCAP08990

50 ml Pyrex beaker

Digital Platform Balance 0.1-gram accuracy

One 325 Mesh sieve, ASTM E-11, 3", 44 micron— available from

VWR Scientific, Cat. No. 57377-009.

Air-circulating oven, maintained at 60° C.±2° C.

Reagents

A. Sodium Acetate, Fischer Scientific, used as received

B. Tacolyn® 1065 Rosin-Based Material Dispersion, Eastman Chemical Company

C. Deionized water, <2 micro-mhos conductivity

Procedure

A total of 3 grams of sodium acetate was added to 12 grams of de-ionized water at room temperature. The resulting solution was added to 1000 grams of TACOLYN® 1065 rosin-based dispersion under hand agitation with a glass rod in a 1 quart jar to produce a crystallization inhibited rosin composition. The TALCOLYN® 1065 rosin-based material contained 12% free rosin acid.

As a control, a separate 1000 gram sample of the same TACOLYN® 1065 rosin-based material dispersion received no treatment. After 5 months storage at ambient laboratory temperatures, the coarse particles were measured for two samples.

The addition of the 0.3% by weight sodium acetate solution prevented crystallization in the crystallization inhibited rosin composition for a period of 5 months. In contrast, the control sample contained crystals and 1200 ppm of coarse particles. The crystallization inhibited rosin composition contained only 100 ppm of coarse particles. The sodium acetate extended the useable shelf life of the crystallization inhibited rosin composition 2½ times when compared to the comparative example.

Example 2

Use of the Crystallization Inhibitors in Molten Rosin

PEXITE® WG wood rosin is a refined natural rosin obtained from pine trees and is manufactured by Hercules Incorporated, Wilmington, Del. It is a solid, pale yellow thermoplastic acidic rosin. Chemically, it contains abietic acids. PEXITE® WG rosin will, like other refined rosins, crystallize. PEXITE® WG rosin is known to crystallize rapidly at 120° C. In this test, sodium acetate effectively retarded crystal growth as compared to the control, which crystallized.

Apparatus

Laboratory Support—4.8"×5.9", Ace Glass, 11210-12

Cork ring—14.0 cm, Ace Glass, 11750-06

Heating mantle—1000 ml, 380w-115v, Glas-Col, 12043-19

Flask—1000 ml four neck-sides 24/40, center 34/45, 90° 10/30, Ace Glass

Nitrogen connecting hose adapter 24/40, Ace Glass, 5205-10,

Stirring shaft, Borosilicate, Precision ground, 10 mm, Ace Glass, 8068-03

Stirrer Blade, PTFE, for 10 mm shaft, 76 mm, Ace Glass, 8085-11

Bearing, Trubore, PTFE, Ace-thred, 10 mm, Ace Glass, 8066-50

Stirrer with sparkless motor, Model RZR 1, VWR (Caframo), 55500-000

Therm-O-Watch programmable controller, Instruments for Research and

Industry, RS-1200A

Thermocouple, Type-J, ¼" dia. X 12" length, Instruments for Research and Industry, TJ¼-12

Reagents

Sodium Acetate, Fischer Scientific, used as received

Nitrogen gas, 99.9% purity

PEXITE® WG wood rosin, Lump, Hercules Incorporated, Wilmington, Del.

Procedure

A total of 300 grams of PEXITE® WG rosin was added to both the control apparatus and the test apparatus. The PEXITE® WG rosin was heated to 175° C. for 30 minutes; after which, the temperature was lowered and held at 95° C. Although not intended to be bound by theory, it is postulated that this heating step destroyed significantly all crystal nuclei. A total of 6 grams of reagent grade sodium acetate solid was added to one of the setups. At 90 minutes, the control sample was crystallized to a solid mass. The sodium acetate retarded crystal growth as compared to the control that crystallized. The test was terminated after the control crystallized.

It is not intended that the examples given here should be construed to limit the invention, but rather, they are submitted to illustrate some of the specific embodiments of the invention. Various modifications and variations of the present invention known to those of ordinary skill in the art can be made without departing from the scope of the invention.

That which is claimed is:

1. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; wherein said rosin-based material is selected from the group consisting of wood rosin, gum rosin and tall oil rosin; and wherein said rosin acid comprises abietic acid forms and their isomers.

2. A crystallization inhibited rosin composition according to claim 1 wherein said abietic acid forms and their isomers is at least one selected from the group consisting of levopimaric acid, palustric acid, neoabietic acid, tetrahydroabietic acid, aleoabietic acid, dihydroabietic acid, dehydroabietic acid, dextropimaric acid, isodextropimaric acid, pimaric acid isopimaric acid, sandaracopimaric acid, delta 8-isopimaric acid, 7,15 pimaradienoic acid, and delta 8-pimaric acid, and mixtures thereof.

3. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; wherein said carboxylic acid is at least one selected from the group consisting of aliphatic or aromatic acids; wherein said aliphatic carboxylic acid has the formula: $R^1COOH$ where $R^1$ can be either H or $CH_3(CH_2)_n$ and wherein n is a number from 0 to 5; wherein said aromatic carboxylic acid is defined by the formula: $R^2COOH$ where $R^2$ comprises an aromatic group; wherein said aliphatic carboxylic acid is selected from the group consisting of formic acid, acetic acid, propanoic acid, butyric acid, and mixtures thereof; and wherein said aliphatic carboxylic acid is acetic acid.

4. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; wherein said carboxylic acid is at least one selected from the group consisting of aliphatic or aromatic acids; wherein said aliphatic carboxylic acid has the formula: $R^1COOH$ where $R^1$ can be either H or $CH_3(CH_2)_n$ and where n is a number from 0 to 5; wherein said aromatic carboxylic acid is defined by the formula: $R^2COOH$ where $R^2$ comprises an aromatic group; and wherein said aromatic carboxylic acid is benzoic acid.

5. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and wherein said salt of carboxylic acid is at least one selected from the group consisting of alkali metal salts of carboxylic acids.

6. A crystallization inhibited rosin composition according to claim 5 wherein said alkali metal salt is selected from the group consisting of sodium, potassium and ammonium.

7. A crystallization inhibited rosin composition according to claim 6 wherein said crystallization inhibitor is sodium acetate.

8. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; wherein said crystallization inhibitor is added to said rosin-based material while the rosin-based material is in a molten state; wherein said crystallization inhibitor is at least one salt of carboxylic acid; and wherein said crystallization inhibitor is sodium acetate.

9. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and wherein said crystallization inhibitor added to a rosin-based material dispersion.

10. A crystallization inhibited rosin composition according to claim 9 wherein said rosin-based material dispersion is a water-based dispersion.

11. A crystallization inhibited rosin composition according to claim 10 wherein said crystallization inhibitor is added to said water-based dispersion in an amount ranging from about 5% or less by weight based on the weight of the water-based dispersion.

12. A crystallization inhibited rosin composition according to claim 11 wherein said crystallization inhibitor is added to said water-based dispersion in an amount ranging from about 1% or less by weight based on the weight of the water-based dispersion.

13. A crystallization inhibited rosin composition according to claim 12 wherein said crystallization inhibitor is added to said water-based dispersion in an amount ranging from about 0.5% or less by weight based on the weight of the water-based dispersion.

14. A crystallization inhibited rosin composition according to claim 9 wherein said rosin-based material dispersion further comprises a hydrocarbon resin.

15. A crystallization inhibited rosin composition according to claim 9 wherein said hydrocarbon resin is at least one selected from the group consisting of low molecular weight thermoplastic polymers derived from cracked petroleum distillates, terpene fractions, coal tar, and a variety of pure monomers.

16. A crystallization inhibited rosin composition according to claim 14 wherein said hydrocarbon resin is hydrogenated.

17. A crystallization inhibited rosin composition according to claim 14 wherein said hydrocarbon resin has a Ring and Ball softening point from about 10° C. to about 190° C. and have weight average molecular weights (Mw), as determined by ASTM D 6579, from about 300 to about 10,000 Mw.

18. A crystallization inhibited rosin composition according to claim 17 wherein said hydrocarbon resin has a Ring and Ball softening point from about 60° C. to about 120° C. and has a weight average molecular weight from about 300 to about 2,000 Mw.

19. A crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and further comprising at least one additive selected from the group consisting of plasticizers, antioxidants, gases, surfactants, stabilizers, thickeners, biocides, and preservatives.

20. A crystallization inhibited rosin composition according to claim 19 wherein said antioxidant is 2,6 di-tert-butyl para-cresol or tetrakis[methylene(3,5 di-tert-butyl-4-hydroxyhydrocinnamate)]methane.

21. An adhesive comprising a crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor.

22. An adhesive according to claim 21 wherein said adhesive is a water-based contact adhesive.

23. A paper sizing composition comprising a crystallization inhibited rosin composition comprising at least one rosin-based material and at least one crystallization inhibitor; wherein said rosin-based material comprises rosin acid; wherein said crystallization inhibitor comprises carboxylic acids and their salts, other than a rosin acid; and wherein said crystallization inhibitor decreases or delays the formation of crystals of the free rosin acids when compared to the rosin-based material without the crystallization inhibitor.

24. A process comprising contacting a rosin-based material and a crystallization inhibitor to produce a crystallization inhibited rosin composition; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and wherein said rosin acid comprises abietic acid forms and their isomers.

25. A process according to claim 24 wherein said abietic acid forms and their isomers is at least one selected from the group consisting of levopimaric acid, palustric acid, neoabietic acid, tetrahydroabietic acid, aleoabietic acid, dihydroabietic acid, dehydroabietic acid, dextropimaric acid, isodextropimaric acid, pimaric acid isopimaric acid, sandaracopimaric acid, delta 8-isopimaric acid, 7,15 pimaradienoic acid, and delta 8-pimaric acid, and mixtures thereof.

26. A process comprising contacting a rosin-based material and a crystallization inhibitor to produce a crystallization inhibited rosin composition; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and wherein said salt of carboxylic acid is at least one selected from the group consisting of alkali metal salts of carboxylic acids.

27. A process according to claim 26 wherein said alkali metal salt is selected from the group consisting of sodium, potassium and ammonium.

28. A process according to claim 27 wherein said crystallization inhibitor is sodium acetate.

29. A process comprising contacting a rosin-based material and a crystallization inhibitor to produce a crystallization inhibited rosin composition; wherein said rosin-based material comprises rosin acid; wherein said crystallization inhibitor comprises carboxylic acids and their salts, other than a rosin acid; wherein said crystallization inhibitor decreases or delays the formation of crystals of the free rosin acids when compared to the rosin-based material without the crystallization inhibitor; and wherein said crystallization inhibitor is added to a rosin-based material dispersion.

30. A process according to claim 29 wherein said rosin-based material dispersion is a water-based dispersion.

31. A process according to claim 30 wherein said crystallization inhibitor is added to said water-based dispersion in an amount ranging from about 5% or less by weight based on the weight of the water-based dispersion.

32. A process according to claim 31 wherein said crystallization inhibitor is added to said water-based dispersion in an amount ranging from about 1% or less by weight based on the weight of the water-based dispersion.

33. A process according to claim 29 wherein said rosin-based material dispersion further comprises a hydrocarbon resin.

34. A process according to claim 33 wherein said hydrocarbon resin is at least one selected from the group consisting of low molecular weight thermoplastic polymers derived from cracked petroleum distillates, terpene fractions, coal tar, and a variety of pure monomers.

35. A process according to claim 29 wherein said hydrocarbon resin has a Ring and Ball softening point from about 10° C. to about 190° C. and have weight average molecular weights (Mw), as determined by ASTM D 6579, from bout 300 to about 10,000 Mw.

36. A process comprising contacting a rosin-based material and a crystallization inhibitor to produce a crystallization inhibited rosin composition; wherein said rosin-based material comprises rosin acid; wherein said crystallization inhibitor comprises carboxylic acids and their salts, other than a rosin acid; and wherein said crystallization inhibitor decreases or delays the formation of crystals of the free rosin acids when compared to the rosin-based material without the crystallization inhibitor; and further comprising at least one additive selected from the group consisting of plasticizers, antioxidants, gases, surfactants, stabilizers, thickeners, biocides, and preservatives.

* * * * *

UNITED STATES PATENT AND TRADEMARK OFFICE
CERTIFICATE OF CORRECTION

PATENT NO. : 6,939,944 B2
DATED : September 6, 2005
INVENTOR(S) : Kutsek

It is certified that error appears in the above-identified patent and that said Letters Patent is hereby corrected as shown below:

Column 11,
Line 42, "wherein n" should read -- where n --.

Column 12,
Line 37, "added to" should read -- is added to --.

Signed and Sealed this

Twenty-first Day of March, 2006

JON W. DUDAS
*Director of the United States Patent and Trademark Office*